United States Patent [19]
Johnson, III et al.

[11] Patent Number: 5,816,660
[45] Date of Patent: Oct. 6, 1998

[54] VEHICLE SEAT SIDE AIR BAG TRIM CLOSEOUT ASSEMBLY

[75] Inventors: G. Lane Johnson, III, Waterford; Patricia J. Tasny, Chesterfield, both of Mich.

[73] Assignee: Lear Corporation, Southfield, Mich.

[21] Appl. No.: 871,232

[22] Filed: Jun. 9, 1997

[51] Int. Cl.⁶ .................................................. A47C 7/02
[52] U.S. Cl. ........................ 297/452.38; 297/216.13
[58] Field of Search .................. 297/452.58, 452.41, 297/452.38, 216.13, 216.14, 216.1, DIG. 3; 280/728.1, 730.1, 730.2, 730 A

[56] References Cited

U.S. PATENT DOCUMENTS

| | | |
|---|---|---|
| 3,669,499 | 6/1972 | Semplonius et al. . |
| 4,637,650 | 1/1987 | Inoue . |
| 4,786,103 | 11/1988 | Selbert . |
| 5,248,356 | 9/1993 | Shimada . |
| 5,364,170 | 11/1994 | West . |
| 5,503,428 | 4/1996 | Awotwi et al. . |
| 5,601,332 | 2/1997 | Schultz et al. . |
| 5,651,582 | 7/1997 | Nakano . |

*Primary Examiner*—Milton Nelson, Jr.
*Attorney, Agent, or Firm*—MacMillan, Sobanski & Todd, LLC

[57] ABSTRACT

A vehicle seat assembly including a side impact air bag module mounted to one of the side bolsters of the seat back. The seat back having a layer of foam cushion encased by a trim cover and an opening therethrough for receiving the air bag module. A trim ring includes a flange extending partially into the opening and a lip fixedly secured around the perimeter of the opening to provide a rigid passageway to receive and mount the air bag module to the seat back.

11 Claims, 9 Drawing Sheets

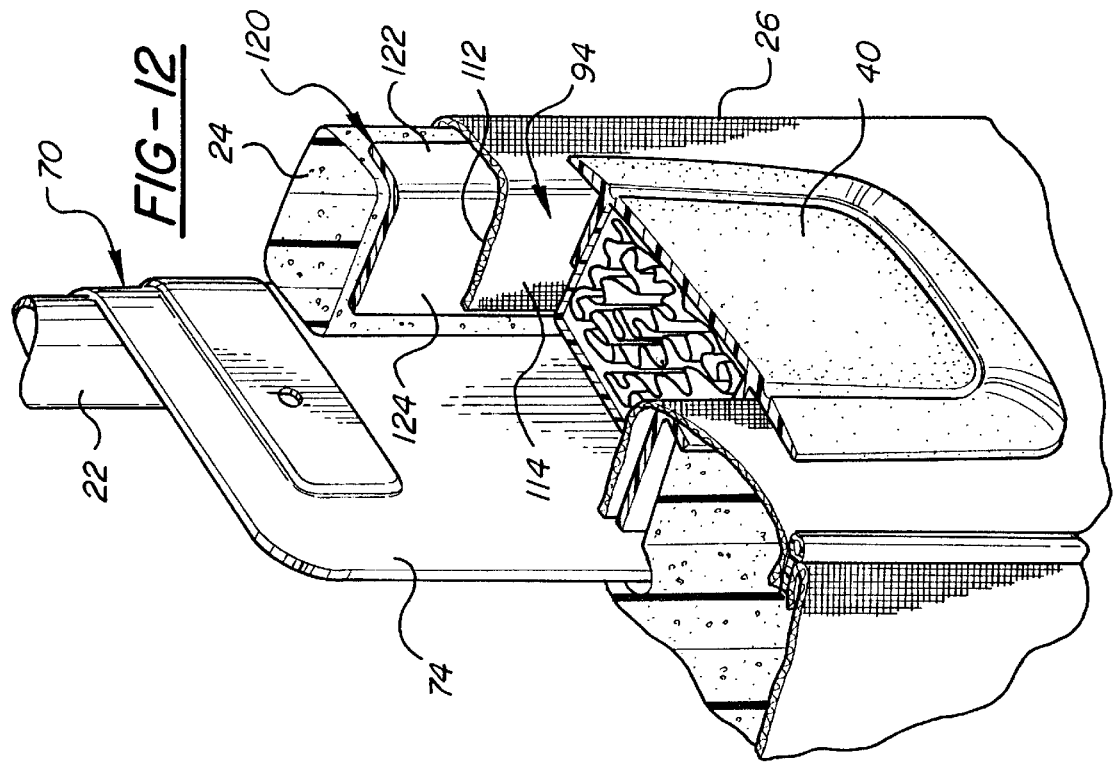
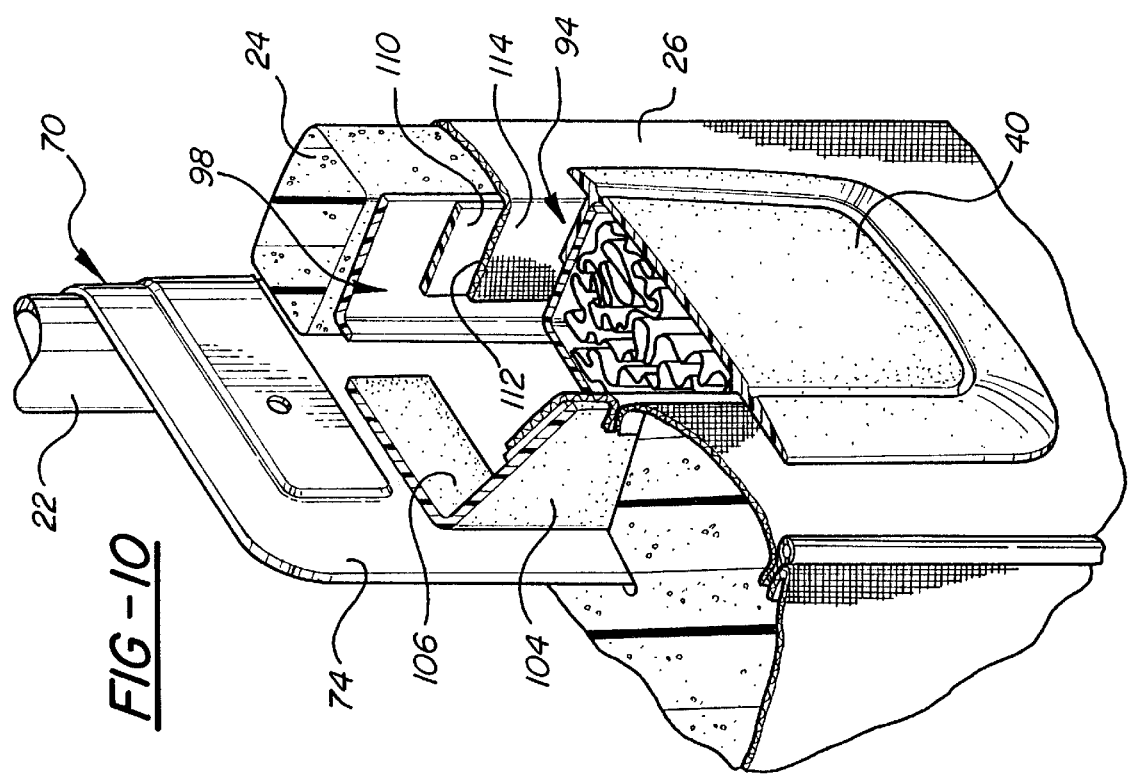

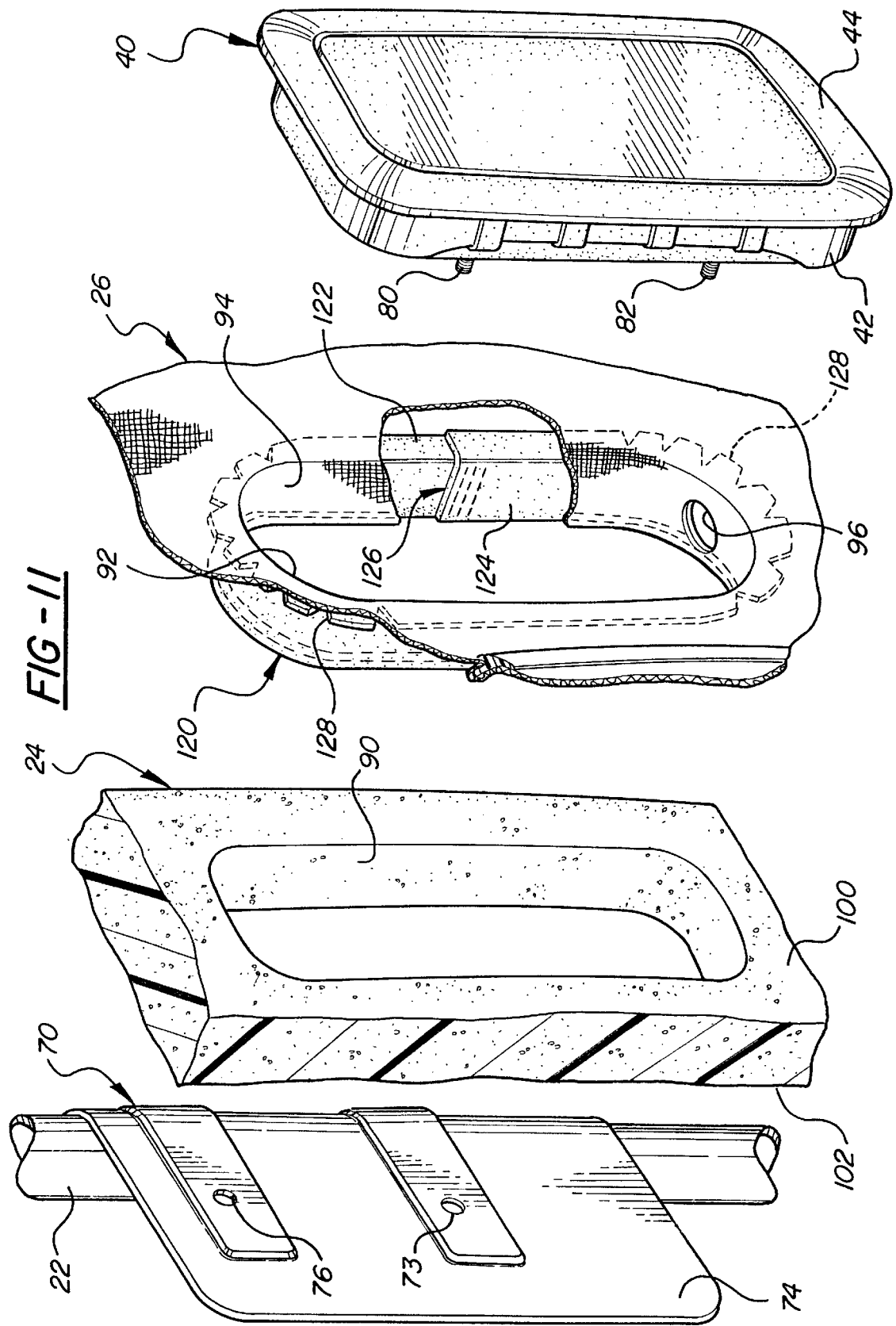

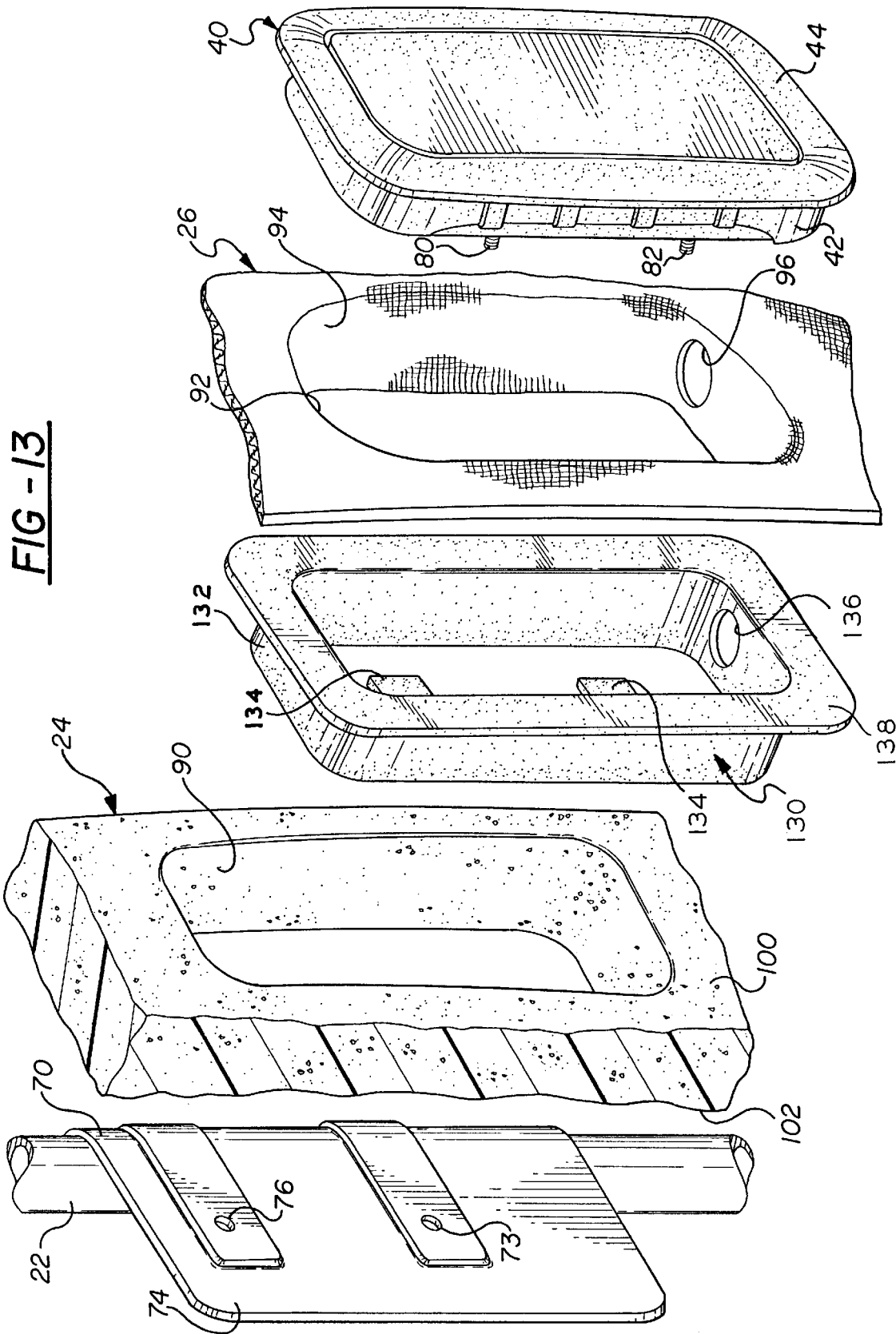

VEHICLE SEAT SIDE AIR BAG TRIM CLOSEOUT ASSEMBLY

TECHNICAL FIELD

The subject invention relates generally to a vehicle seat assembly having a side impact air bag module and, more particularly, to a trim ring for providing a rigid opening for receiving and mounting the air bag module to the seat assembly.

BACKGROUND OF THE INVENTION

It is becoming increasing important to provide vehicle seat occupants protection during a side impact collision by use of side impact air bag assemblies mounted to the side bolster section of the vehicle seat or in the interior door panel of the vehicle.

It is common to provide a side impact air bag assembly in the vehicle seat by mounting the air bag assembly or module to the seat bottom or seat back frame. However, the air bag is typically mounted behind a layer of foam cushion and fabric trim cover of the seat assembly. Therefore, during a vehicle side collision, the air bag must explode from the seat assembly and eject through the layer of foam cushion and trim cover, thus, permanently damaging the construction of the seat assembly.

The U.S. Pat. Nos. 5,348,342 to Haland et al., issued Sep. 20, 1994, and 5,112,079 also to Haland et al., issued May 12, 1992 disclose such side impact air bag assemblies mounted in the seat back of a vehicle seat. The air bag module is assembled to the seat back frame behind the foam cushion and trim cover of the seat back during the seat manufacturing process. Upon activation of the air bag assembly, the air bag must eject through a portion of the side bolster of the seat and through the foam cushion and trim cover. The foam cushion and trim cover is often permanently damaged by the explosion of the air bag assembly therethrough. Further, the seat assembly must be replaced or significantly repaired after activation of the air bag assembly.

Therefore, it remains desirable to provide a vehicle seat assembly for use with a side impact air bag assembly which is mounted to the seat assembly and ejects or passes through the layer of foam cushion and trim cover without damage to the seat assembly. Further, it is desirable to have a seat assembly with a readily accessible air bag assembly to facilitate repair or replacement of the air bag assembly after activation without causing damage to the seat assembly.

SUMMARY OF THE INVENTION AND ADVANTAGES

A vehicle seat assembly comprising a generally horizontal seat bottom defining an occupant sitting area and a generally upright seat back defining an occupant back support. Each of the seat bottom and the seat back including a resilient foam cushion encased by a trim cover. At least one of the seat bottom or seat back having an opening passing through each of the foam cushion and the trim cover. A trim ring received in the opening of the foam cushion providing a rigid peripheral rim around the inner circumference of the opening and a trim strip fixedly secured to around the periphery of the opening in the trim cover and overlaying the trim ring in the opening of the foam cushion for providing a rigid passageway through the openings of the foam cushion and the trim cover.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a across-sectional view taken through line 4—4 of FIG. 3;

FIG. 10 is a cross-sectional view of the assembly according to FIG. 9;

FIG. 11 is a exploded perspective view of another alternative embodiment of a trim ring attached to an inner rim of the trim cover in the opening;

FIG. 12 is a cross-sectional view of the assembly according to FIG. 11.

FIG. 13 is an exploded perspective view of yet another alternative embodiment of the trim ring attached to the inner rim of the trim cover in the opening.

DETAILED DESCRIPTION OF THE PREFERRED EMBODIMENTS

Referring to the Figures, wherein like numerals reference like or corresponding parts throughout the several views, an automotive vehicle seat assembly is general shown at 10. The seat assembly 10 comprises a generally horizontal seat bottom 12 upon which an occupant sits, and a generally upright seat back 14 coupled to the seat bottom 12 by a hinge mechanism 16. The hinge mechanism 16 provides pivotal fore and aft movement of the seat back 14 relative to the seat bottom 12.

Figure 1:
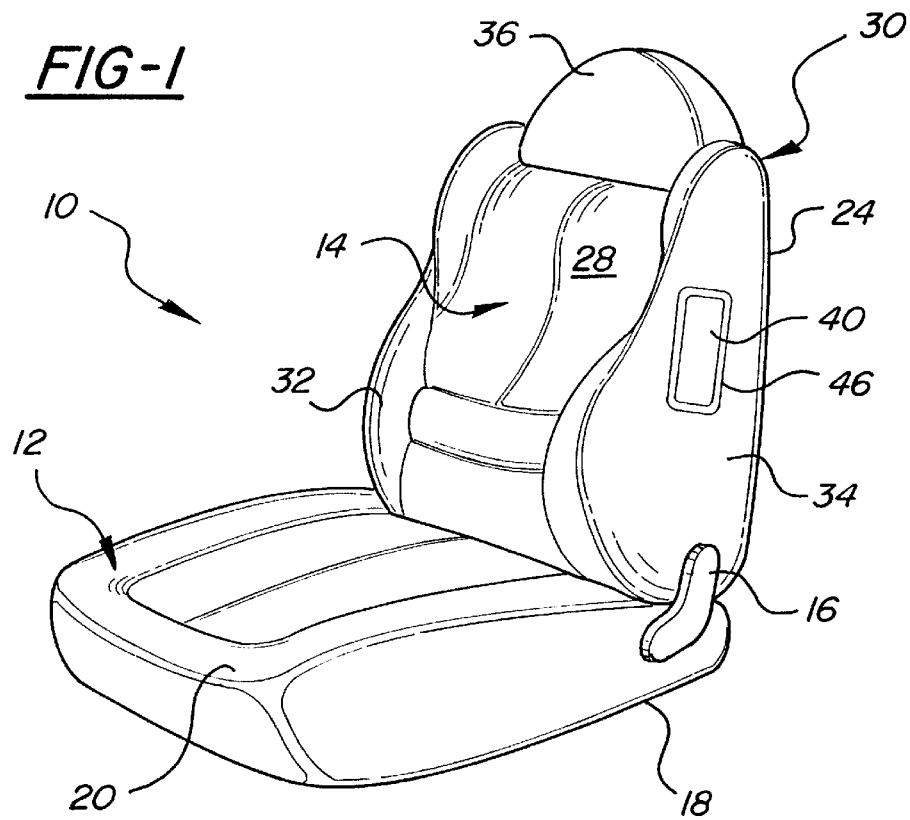
FIG. 1 is a perspective view of a vehicle seat assembly according to the subject invention.
Figure 7:
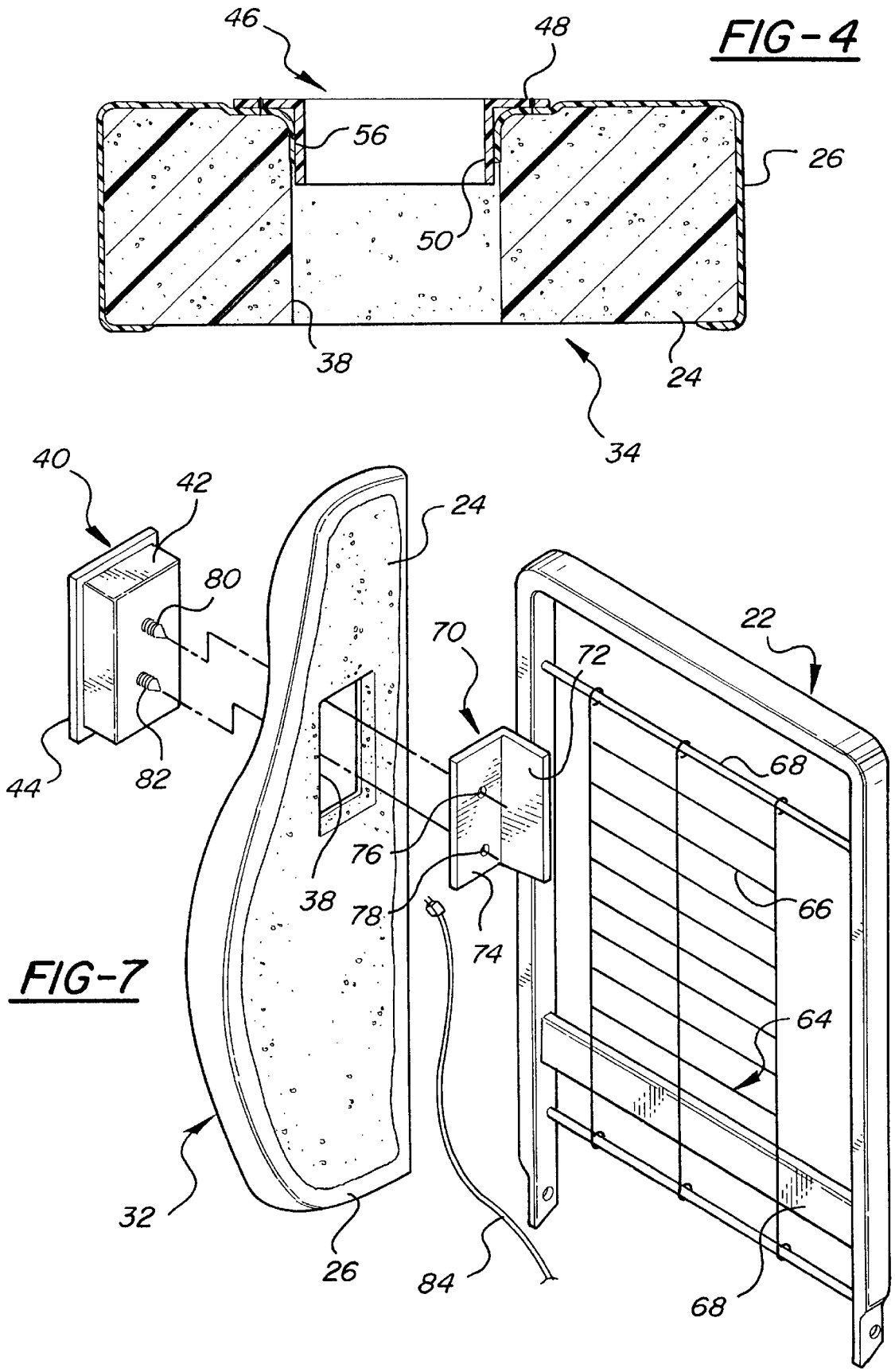
FIG. 7 is an exploded perspective view of the vehicle seat back assembly.

Referring to FIGS. 1 and 7, the seat assembly 10 is further shown. The seat bottom 12 includes a rigid seat bottom frame (not shown), usually made of tubular metal as commonly known in the art. The seat bottom frame supports a contoured foam cushion 18 which is encased in a trim cover 20. Similarly, the seat back 14 includes a rigid seat back frame 22, also made of tubular metal. The seat back frame 22 supports a contoured cushion 24 which is encased in a trim cover 26. The foam cushions 18, 24 are commonly made of polyester or other resilient foam material common in the automotive seating art. Further, the trim covers 20, 26 typically include upholstery of cloth fabric, vinyl or leather.

The seat back 14 further includes a front surface 28, a rear surface 30 and a pair of bolsters 32,34. The bolsters 32,34 are formed on opposing sides of the front 28 and rear 30 surfaces of the seat back 14 for supporting the lateral sides of the seat occupant. The seat assembly 10 also includes a headrest 36 secured to the top portion of the seat back 14.

Figure 2:
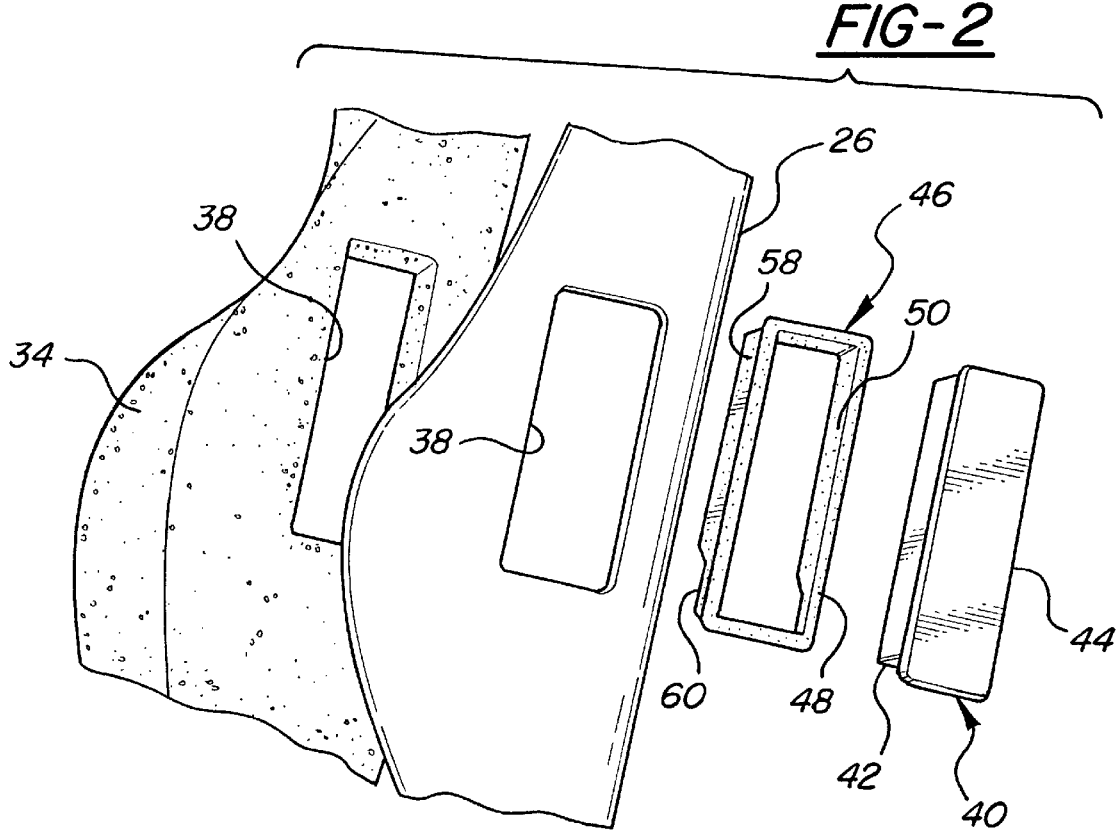
FIG. 2 is an exploded view of a side bolster section of the vehicle seat assembly.

Referring to FIGS. 1 and 2, the seat back 14 includes a generally rectangular opening 38 which passes completely through the layers of foam cushion 24 and trim cover 26. The opening 38 provides access or exposes the seat back frame 22 positioned behind the layer of foam cushion 24 and trim cover 26. It should be appreciated that the opening 38 may vary in size and shaped from that shown in the preferred embodiment. Further, the opening may be located along portions of the seat back 14 as shown, seat bottom 12 or headrest 36. The preferred embodiment of FIGS. 1, 2 and 7 disclose the opening 38 in one of the side bolster sections 32, 34 of the seat back 14 to expose or provide access to the seat back frame 22.

The seat assembly 10 further includes a side impact air bag module 40 received in the opening 38 and disposed in the side bolster 34 of the seat back 14. The side impact air bag module 40 may be of the type commonly known in the automotive industry similar to that shown in U.S. Pat. No. 5,419,579 by TRW Vehicle Safety Systems Inc. Referring to FIG. 2, the air bag module 40 includes a generally rectangular body portion 42 which is received in the opening 38 and a top cover 44 which protrudes outwardly from the base to abut the perimeter of the opening 38 and prevent the module 40 from passing therethrough.

The assembly 10, according to the preferred embodiment of FIGS. 2–6, is characterized by including a trim ring 46 which extends partially into the opening 38 and is fixedly secured to the trim cover 26 for providing a rigid entrance into the opening 38 spaced from the foam cushion 24 and trim cover 26 for receiving the side impact air bag module 40. More specifically, referring to FIGS. 2–6, the trim ring 46 includes a generally rectangular configuration corresponding to the shape of the opening 38 and having an outwardly extending lip 48 around the perimeter thereof and a flange 50 extending downwardly from the lip 48. The flange 50 extends generally perpendicular from the lip 48 and forms a generally L-shaped configuration therewith in cross-section. The flange 50 extends partially into the opening 38 and the lip extends around the perimeter 52 of the opening 38.

Figure 3:
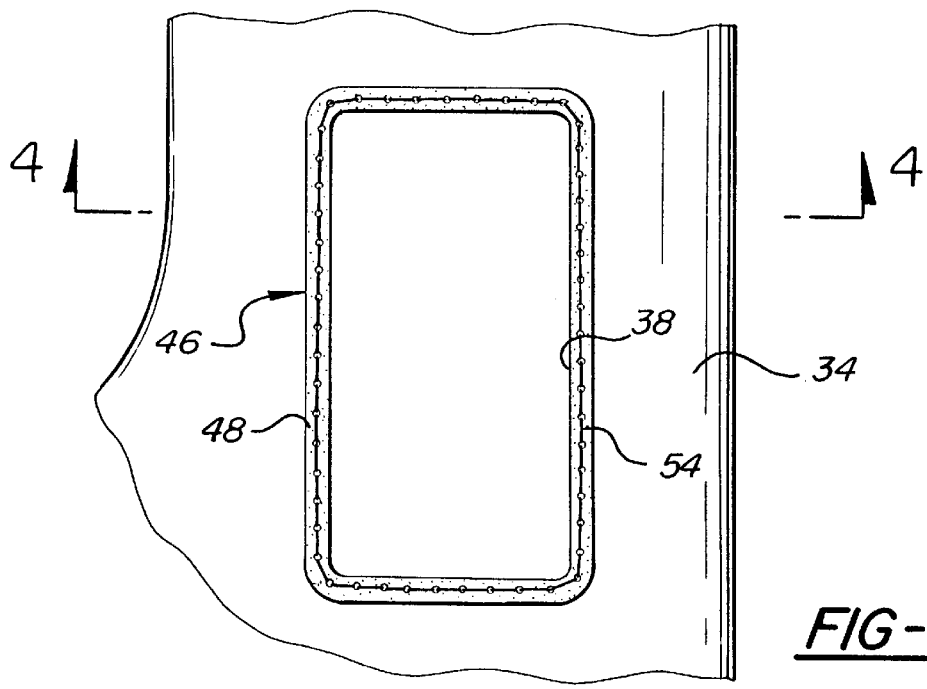
FIG. 3 is a side view of a trim ring and opening in the side bolster section according to the subject invention.

The trim ring 46 consists of a polypropylene material. The lip 48 of the trim ring 36 is fixedly secured to the trim cover 26 by a plurality of threaded stitches commonly referred to as surface stitches 54, as shown in FIG. 3. Further, as shown in FIG. 4, the trim cover 26 includes a peripheral edge 56 around the perimeter of the opening 38 which is fixedly secured by the stitches 54 between the trim ring 46 and foam cushion 24.

Figure 5:
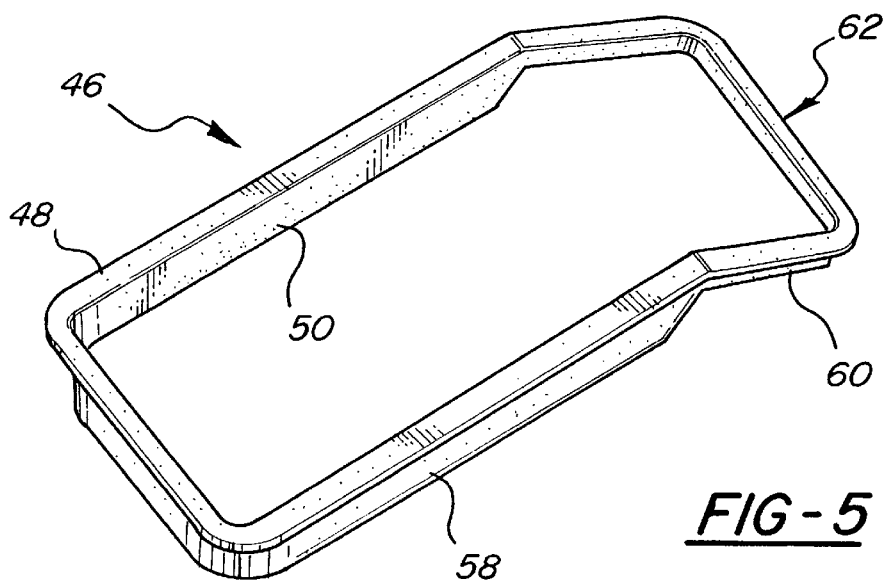
FIG. 5 is a perspective view of the trim ring according to the subject invention.
Figure 6:
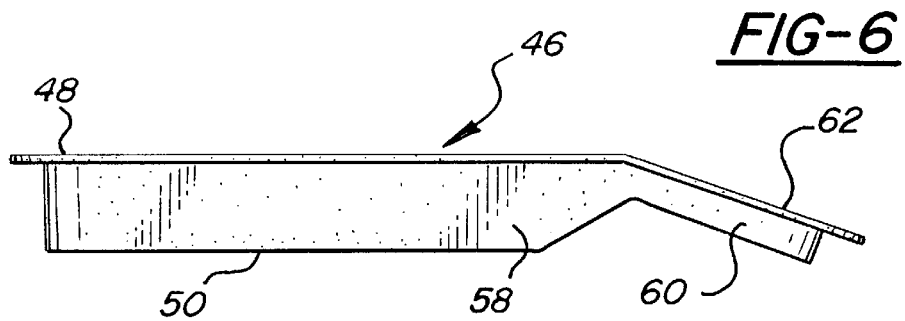
FIG. 6 is a view of the trim ring of FIG. 5.

Referring to FIGS. 5 and 6, the flange 50 of the trim ring 46 includes a first portion 58 with a predetermined length extending partially into the opening 38 and a second portion 60 having a predetermined length less than the length of the first portion 58 and also extending partially into the opening 38. The first portion 58 of the flange 50 is approximately one-half the length or thickness of the layer of foam cushion 24. Further, the second portion 60 is approximately one-half the length of the first portion 58. More specifically, the trim ring 46 of the preferred embodiment of FIG. 6 discloses the lip 48 having a thickness of 2 mm, the first portion 58 of the flange 50 having a length of 10 mm and the second portion 60 having a length of 5 mm. Further, one end 62 of the trim ring 46 extends downwardly at a predetermined angle from the remaining end of the trim ring 46. The shape of the trim ring 46 is dictated and corresponds to the general shape and configuration of the air bag module 40 to receive the same therein. It should be appreciated, therefore, that the shape and configuration of the trim ring 46 may vary from that shown in the preferred embodiment according to the shape and configuration of the air bag module 40.

Figure 8:
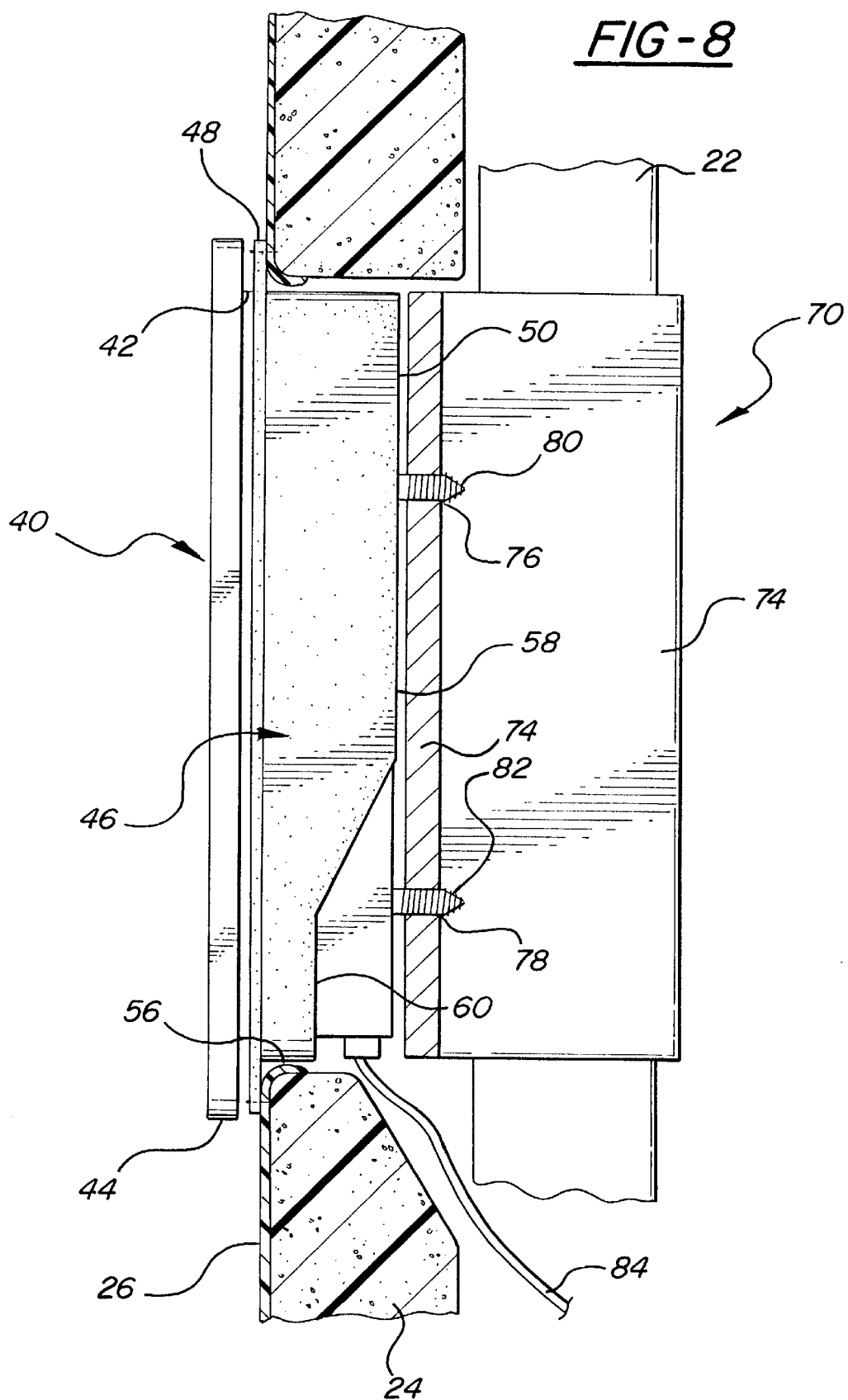
FIG. 8 is a side view of the trim ring and air bag module connected to the seat frame according to subject invention.

Finally, referring to FIGS. 7 and 8, the seat back frame 22 consists of a tubular metal frame forming a generally U-shaped support structure. A seat suspension system 64 comprises a plurality of resilient torsion wires 66 and support beams 68 as commonly known in the automotive seating art. The seat back frame 22 includes a generally L-shaped bracket 70 fixedly secured by welds, or the like, to a section of the tubular frame adjacent the seat back side bolster section 32. The bracket 70 includes a base plate 72 mounted to the seat back frame 22 and an outwardly extending mounting plate 74 which is positioned immediate behind and adjacent the opening 38 in the side bolster 32. The mounting plate 74 includes a pair of apertures 76,78 therethrough. The seat back side bolster 32 including the foam cushion 24 and trim cover 26 is positioned onto the seat back frame 22 with the opening 38 aligned with the mounting plate 74 of the bracket 70. The trim ring 46 is secured to the trim cover 26 and extends from the outer surface of the seat back 14 into the opening 38. The trim ring 46 is spaced from the layer of foam cushion 24 and trim cover 26 to ensure that portions of the cushion 24 and cover 26 do not extend into or interfere with the opening 38.

The side impact air bag module 40 includes a pair of fasteners 80,82, generally of the type referred to as "Christmas tree" fasteners, extending outwardly from the bottom of the body portion 42 of the module 40. The module is received in the opening 38 and the top cover 44 abuts the lip 48 of the trim ring 46 to compress the foam cushion 24 toward the seat back frame 22 until the fasteners 80,82 are received into the apertures 76,78 to fixedly secure the module 40 to the bracket 70. With the foam cushion 24 compressed toward the seat back frame 22, the bottom edge of the trim ring 46 abuts against the surface of the mounting plate 74 of the bracket 70 to provide a rigid opening in the side bolster 32 of the seat back 14.

A small clearance or gap of approximately 3 mm exists between the sides of the body portion 42 of the module 40 and the flange 50 of the trim ring to provide sufficient clearance or tolerance for insertion of the module through the opening 38. Further, the second portion 60 of the trim ring 46 having a length less than the first portion 58 allows for an electrical wiring harness 84 to pass partially through the bottom portion of the opening 38 for connection with the air bag module without interfering with the rigid entrance of trim ring 46. More specifically, the first portion 58 of the trim ring 46 abuts against the mounting plate 74 of the bracket 70 and the second portion 60 is spaced therefrom leaving a gap for passage of the electrical wiring harness 84 to the module.

Alternatively, the mounting plate 74 of the bracket 70 may be slightly smaller than the opening 38 and thus only engage a portion of the trim ring 46 while abutting the module 40 and locking the fasteners 80,82 into the apertures 76,78.

Figure 9:
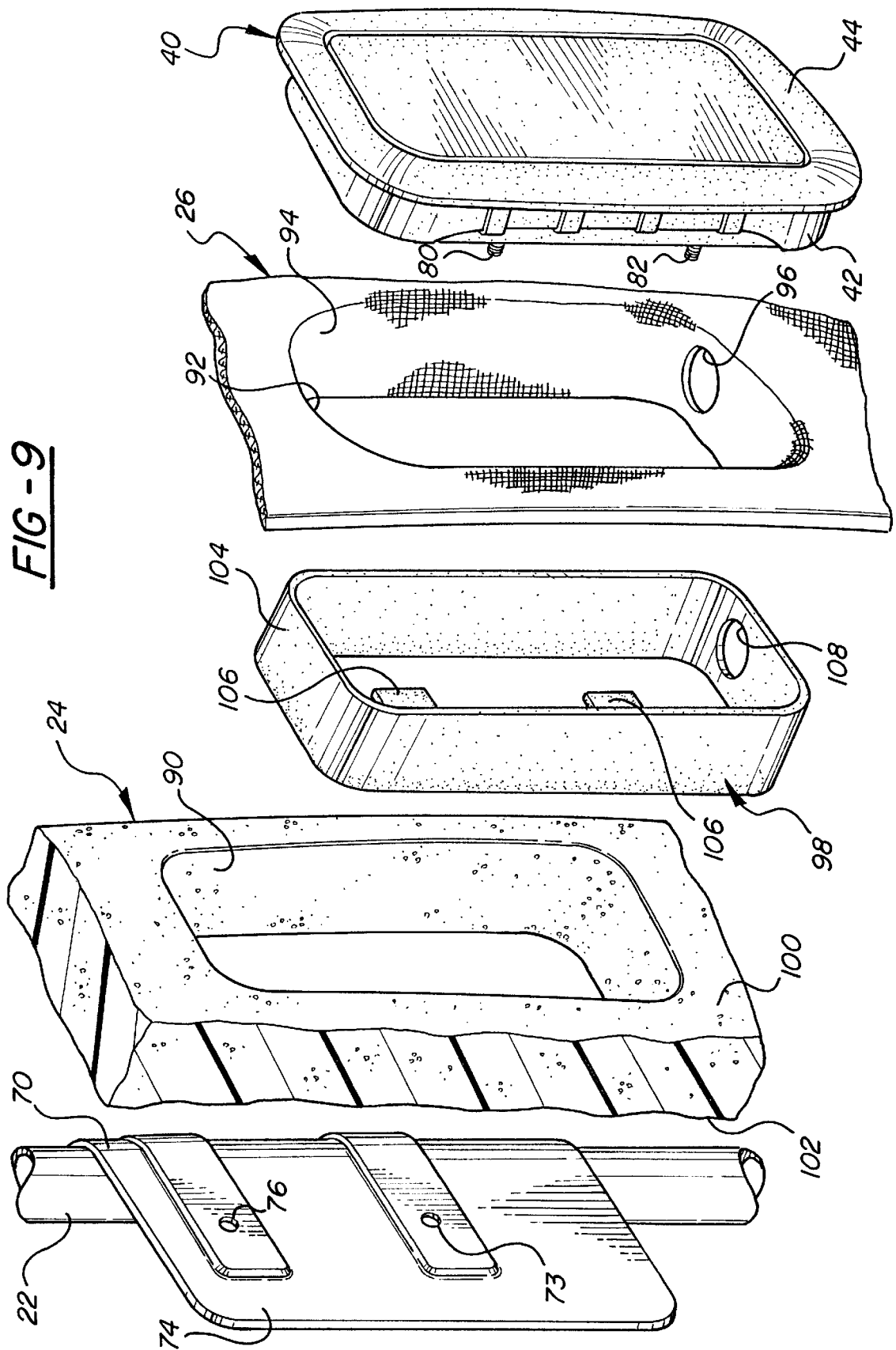
FIG. 9 is an exploded perspective view of an alternative embodiment including a trim ring and a trim strip received in the opening.

Referring to FIGS. 9 and 10, an alternative embodiment of the seat assembly is shown comprising the seat back frame 22 supporting a bracket 70 having a mounting plate 74 for receiving and supporting the air bag module 40 on the seat back 14. Similar to the embodiment of FIGS. 1–8, the seat back frame 22 further supports a resilient contoured foam cushion 24 which is encased in a fabric trim cover 26. The foam cushion 24 includes a generally rectangular opening 90 therethrough for receiving the air bag module 40 and exposing the mounting plate 74. The trim cover 26 also has a generally rectangular opening 92 therethrough for receiving the air bag module 40. The trim cover 26 includes an inner rim or band of material 94 defining the opening 92 and extending at least partially through the opening 90 in the foam cushion 24. The inner rim 94 of the trim cover 26 is flexible and extends generally perpendicular from the remaining material of the trim cover 26 encasing the foam cushion 24. The inner rim 94 further includes an aperture 96 therein for passing the electrical wiring harness 84 of the air bag module 40 through the cover 26 to a power source.

The assembly includes a generally rectangular trim ring 98 made of a rigid polypropylene material and received in the opening 90 in the foam cushion 24 providing a rigid peripheral rim around the inner circumference of the opening 90. More specifically, the foam cushion 24 includes a front face 100 and a rear face 102 spaced from the front face 100 by the thickness of the foam and with the opening 90 extending therebetween. The trim ring 98 has a width equal to the thickness of the foam to extend through the opening 90 between the front 100 and rear 102 faces. The trim ring 98 includes an upstanding wall 104 lining the opening 90 of the foam cushion 24 and a pair of spaced apart flanges 106 extending inwardly toward the center of the opening 90 from the wall 104 adjacent the rear face 102 of the foam for engaging and supporting the trim ring 98 against the mounting plate 74 of the support bracket 70. The wall 104 of the trim zing 98 likewise includes an aperture 108 for passing the wiring harness 84 therethrough to the power source.

Referring to FIG. 10, a trim strip 110, consisting of a semi-rigid polypropylene material, is fixedly secured around the periphery of the opening 92 in the trim cover 26 and overlays the trim ring 98 in the opening 90 of the foam cushion 24 for providing a rigid entrance or passageway passing through the opening 90,92 of the cushion 24 and trim cover 26. The inner rim 94 of the trim cover 26 has an inner surface 112 defining the opening 92 and an outer surface 114 adjacent the opening 90 of the foam cushion 24.

The trim strip 110 is an elongated flat strip formed into a generally rectangular configuration corresponding to the trim ring 98 and openings 90,92. The trim strip 110 is secured to the outer surface 114 of the rim 94 of the trim cover 26 by a plurality of threaded stitches, adhesive or other commonly known fastening means. The trim strip 110 provides a rigid opening 92 in the trim cover 26 and is received in overlapping relationship against the trim ring 98 in the opening 90 of the foam cushion 24.

By way of assembly, the foam cushion 24 is placed over the seat back frame 22 with the opening 90 aligned with the bracket 70. The trim ring 98 is inserted into the opening 90 with the upstanding wall 104 lining the opening 90 and the flanges engaging the upper surface of the mounting plate 74. The trim cover 26 initially has the inner rim 94 defining the opening 92 turned inside-out, that is, projecting outwardly from the seat assembly. The inner rim 94 with the trim strip 110 attached around the periphery of the opening 92 is then flipped outside-in and received into the opening 90 of the foam cushion 24 with the trim strip 110 overlapping the trim ring 98. Thus, the inner rim 94 covers the trim strip 110 and at least part of the trim ring 98.

The air bag module 40 is then received through each of the openings 90,92 in the foam cushion 24 and trim cover 26 and secured to the bracket 70 by fasteners 80,82. The body portion 42 of the module 40 is received through the openings 90,92 and abuts against the inner rim 94 of the trim cover 26 while the top cover 44 closes the opening 92 in the trim cover 26 and abuts against the outer surface of the cover 26.

The trim ring 98 and trim strip 110 provide a rigid opening between the module 40 and the bracket 70 and prevent the foam cushion 24 from pulling away from the module 40 and potentially exposing the connections or body of the module 40.

FIGS. 11 and 12 disclose yet another alternative embodiment of the subject invention. The seat back frame 22 is shown with a bracket 70 and mounting plate 74 for receiving and supporting the air bag module 40. A foam cushion 24 including a generally rectangular opening 90 therethrough covers the frame 22 and exposes the mounting plate 74 for mounting the module 40. A trim cover 26 also having a generally rectangular opening 92 covers the foam cushion 24. The foam cushion 24 and trim cover 26 are similar to those shown in FIGS. 9 and 10. The trim cover 26 includes an inner rim or band of material 94 defining the opening 92 and extending at least partially into the opening 90 in the foam cushion 24. An aperture 96 in the inner rim 94 provides a passageway for the wiring harness 84 of the module 40.

The assembly shown in FIGS. 11 and 12 includes a generally rectangular trim ring 120, made of a rigid polypropylene material fixedly, secured to the inner rim 94 of the trim cover 26 and received in the opening 90 in the foam cushion 24 for providing a rigid passageway through the openings 90,92 for receiving the air bag module 40. Again, the trim ring 120 and corresponding openings 90,92 may be configured to any size, shape and depth depending on the desired application.

The trim ring 120 includes an outwardly extending lip 122 and a flange 124 extending downwardly from the lip 122 and generally perpendicular therefrom forming a generally L-shaped configuration when viewed in cross-section as shown in FIG. 12. The trim ring 120 is secured to the inner rim 94 with the flange 124 extending through the opening 90 in the foam cushion 24 and the lip 122 sandwiched between the trim cover 26 and the front faced 100 of the foam cushion 24. The trim ring 120 is secured by a plurality of threaded stitches to the outer surface 114 of the inner rim 94 such that the inner rim 94 of the trim cover 26 completely covers the flange 124 of the trim ring 26 concealing the ring 120 in the openings 90,92. The trim ring 120 is an elongated strip shaped to the configuration of the openings 90,92 and secured at a juncture 126. The lip 122 includes a plurality of notches 128 extending to the flange 124 around the curved portion of the trim ring 120 to facilitate rounding or bending of the trim ring 120 to correspond with the configuration of the openings 90,92.

The air bag module 40 may then be inserted through the openings 90,92 in the foam cushion 24 and trim cover 26 and secured to the bracket 70. The distal end of the flange 124 of the trim ring 120 abuts against the mounting plate 74 and the top cover 44 of the module 40 abuts against the trim cover 26 and lip 122 of the trim ring 120 to prevent the foam cushion from pulling away from the module around the openings 90,92.

Figure 14:
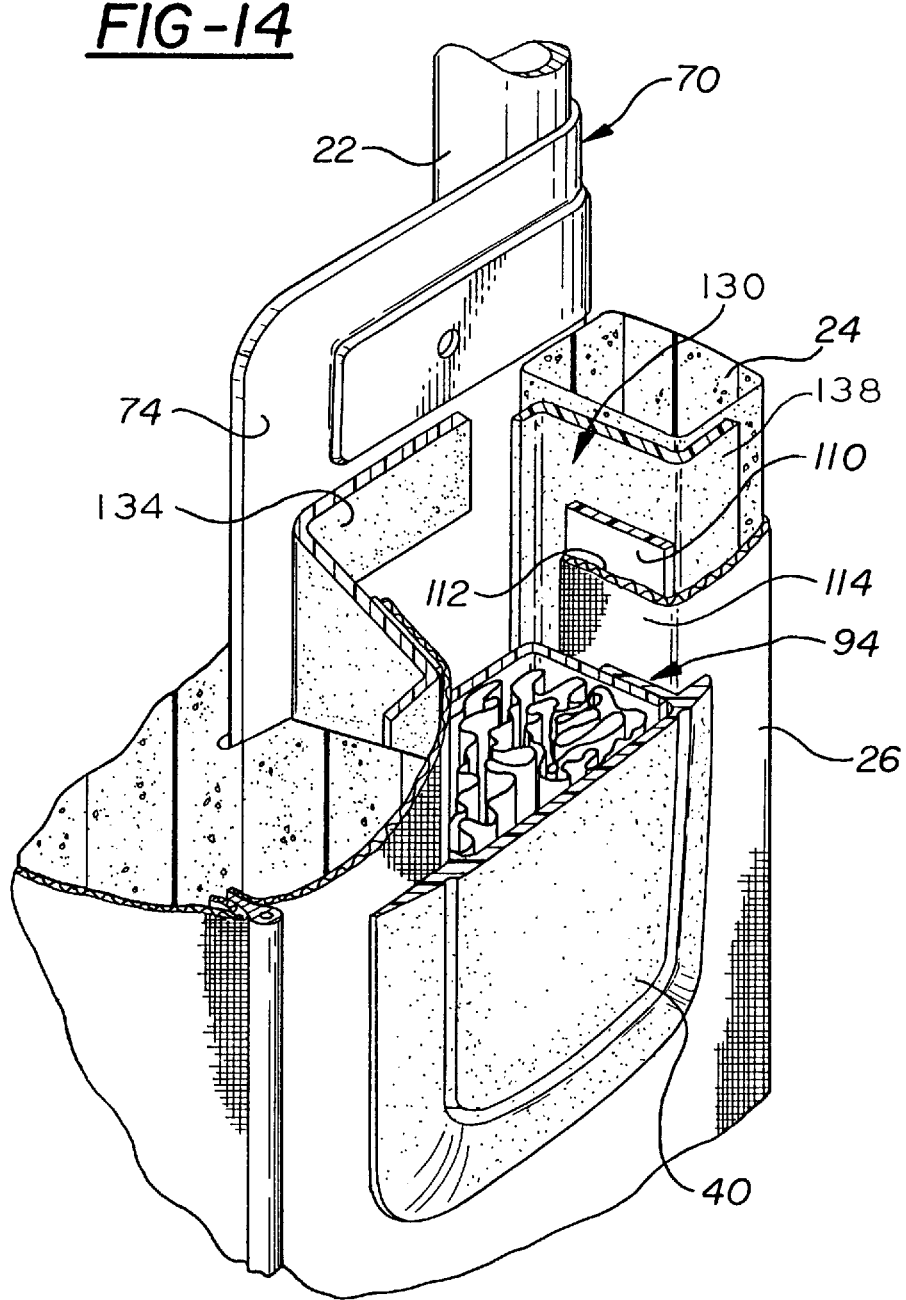
FIG. 14 is a cross-sectional view of the assembly according to FIG. 13.

Finally, FIGS. 13 and 14 disclose yet another alternative embodiment of the subject invention. The assembly is similar to that shown in FIG. 9 and 10. The assembly includes a generally rectangular trim ring 130 made of a rigid poloypropylene material and received in the opening 90 in the foam cushion 24 for providing a rigid peripheral rim around the inner circumference of the opening 90. The trim ring 130 includes an upstanding wall 132 lining the opening 90 of the foam cushion 24 and a pair of spaced apart flanges 134 extending inwardly toward the center of the opening 90 from the wall 132 adjacent the rear face 102 of the foam for engaging and supporting the trim ring 130 against the mounting plate 74. The wall 132 of the trim ring 130 likewise includes an aperture 136 for passing the wiring harness 84 therethrough to the power source.

The trim ring 130 differs from that shown in FIGS. 9 and 10 by including a lip 138 extending outwardly and generally perpendicular from the upstanding wall 132 forming generally L-shaped configuration when viewed in cross-section as shown in FIG. 14.

When the upstanding wall 132 of the trim ring 130 is inserted through the opening 90 in the foam cushion 24, the lip 138 abuts the front face 100 of the foam 24 around the perimeter of the opening 90. The inner rim 94 of trim cover 26 is then received into the opening 90 and overlays the trim ring 130. The inner rim 94 may also include the trim strip 110 attached around the periphery of the opening 92 as shown in FIG. 14. Thus, the trim ring 130 also provides a rigid opening or passageway between the module 40 and brackets 70 to prevent the foam cushion 24 from pulling away from the module and potentially exposing the connections or body of the module 40. Alternatively, the inner rim 94 may include the trim ring 120 as shown in FIG. 11 secured to the inner rim 94 with the flange 124 extending through the opening in the trim ring 130 and the lip 122 of the ring 120 overlapping the lip 138 of the ring 130. Thus, the assembly would include both the trim ring 130 received in the opening 90 of the foam 24 and the trim ring 120 secured to the trim cover 26 and received in the opening of the trim ring 130.

The invention has been described in an illustrative manner, and it is to be understood that the terminology which has been used in intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practice otherwise than as specifically described.

What is claimed is:

1. A vehicle seat assembly adapted to receive a side impact air bag module comprising:

a generally horizontal seat bottom defining an occupant sitting area, said seat bottom including opposing sides;

a generally upright seat back defining an occupant back support, said seat back including a front surface a rear surface, and opposing sides;

each of said seat bottom and said seat back including a resilient foam cushion encased by a trim cover;

at least one of said seat bottom or said seat back having an opening passing through each of said foam cushion and said trim cover at one of said sides;

a trim ring received in said opening of said foam cushion providing a rigid peripheral rim around an inner circumference of said opening; and a trim strip fixedly secured around a periphery of said opening in said trim cover and positioned between said trim cover opening periphery and said trim ring received in said opening of said foam cushion for providing a rigid passageway through said openings of said foam cushion and said trim cover.

2. An assembly as set forth in claim 1 wherein said trim cover includes an inner rim of material defining said opening in said trim cover, said inner rim extending at least partially through said opening of said foam cushion.

3. An assembly as set forth in claim 2 wherein said inner rim has an inner surface defining said opening and an outer surface, said trim strip is fixedly secured along said outer surface of said rim to provide rigidity to said opening.

4. An assembly as set forth in claim 3 wherein said trim ring includes an upstanding wall lining said opening of said foam cushion and at least one flange extending inwardly from said wall for engaging and supporting said trim ring against a support bracket on one of said seat bottom or seat back.

5. An assembly as set forth in claim 4 wherein said trim strip is fixedly secured to said outer surface of said trim cover by a plurality of threaded stitches.

6. An assembly as set forth in claim 5 wherein said trim ring and said trim strip being a polypropylene type of material.

7. An assembly as set forth in claim 6 wherein said seat back includes a front back support surface, a rear surface and a pair of bolster sections on opposing sides of said front and rear surfaces, said opening of said foam cushion and said trim cover passing through one of said side bolster sections in said seat back.

8. A vehicle seat assembly comprising:

a generally horizontal seat bottom and a generally upright seat back;

each of said seat bottom and said seat back including a rigid seat frame supporting a resilient contoured foam cushion encased in a trim cover;

at least one of said seat bottom or said seat back having an opening passing through each of said foam cushion and said trim cover to expose a portion of said respective seat frame;

a side impact air bag module;

a trim ring received in said opening of said foam cushion providing a rigid peripheral rim around the inner circumference of said openings; and a trim strip fixedly secured around the periphery of said opening in said trim cover and overlapping said trim ring in said opening of said foam cushion; said trim ring and said trim strip providing a rigid passageway through said openings of said foam cushion and said trim cover for receiving said side impact air bag module therethrough and mounting said module in said openings to said seat frame.

9. An assembly as set forth in claim 8 wherein said trim cover includes an inner rim of material defining said opening in said trim cover, said trim strip fixedly secured to said inner rim to extend said rim at least partially through said opening of said foam cushion in overlapping relationship with said trim ring.

10. A vehicle seat assembly adapted to receive a side impact air bag module comprising:

a seat back defining an occupant back support, the seat back including a cushion covered by a trim cover, the cushion having a front surface, a rear surface, and opposing lateral sides;

an opening passing through each of the cushion and trim cover at one of the sides of the cushion;

a trim ring received in the opening of the cushion; and a trim strip secured around a periphery of the opening in the trim cover.

11. A vehicle seat assembly adapted to receive a side impact air bag module comprising:

a seat back including a front surface, a rear surface, and at least one lateral side bolster;

the bolster including a cushion covered by a trim cover;

an opening passing through the cushion and trim cover of the bolster;

a trim ring received in the opening of the cushion; and a trim strip secured around a periphery of the opening in the trim cover.

* * * * *